United States Patent [19]
Hilditch et al.

[11] Patent Number: 5,737,741
[45] Date of Patent: Apr. 7, 1998

[54] DISK ARRAY WITH PARITY DATA STORAGE ON THE RADIALLY INNER PART OF EACH DISK

[75] Inventors: Albert Stephen Hilditch, Wokingham; Ian Gregory Colloff, Ascot, both of England

[73] Assignee: International Computers Limited, London, England

[21] Appl. No.: 515,492

[22] Filed: Aug. 15, 1995

[30] Foreign Application Priority Data

Sep. 16, 1994 [GB] United Kingdom ............ 9418655
Mar. 29, 1995 [GB] United Kingdom ............ 9506419

[51] Int. Cl.$^6$ ............................. G06F 12/00; G06F 11/10
[52] U.S. Cl. .............................. 711/114; 395/182.04
[58] Field of Search ........................... 395/441, 182.04; 711/114

[56] References Cited

U.S. PATENT DOCUMENTS

| | | | |
|---|---|---|---|
| 5,321,826 | 6/1994 | Ushiro | 395/441 |
| 5,432,922 | 7/1995 | Polyzois et al. | 395/182.04 |
| 5,537,567 | 7/1996 | Galbraith et al. | 395/182.04 |

FOREIGN PATENT DOCUMENTS

| | | |
|---|---|---|
| 0 481 759 | 4/1992 | European Pat. Off. . |
| 8403689 | 12/1995 | Netherlands . |

OTHER PUBLICATIONS

Ganger, "Disk Arrays High–Performance, High Reliability Storage Subsystems", Computer, vol. 27, No. 3, Mar. 1994, pp. 30–36.
Lee, "Performance Consequences of Parity Placement in Disk Arrays", Computer Architecture News, vol. 19, No. 2, Apr. 1999, pp. 180–199.
Gray, "Parity Striping of Disk Arrays: Low–Cost Reliable Storage with Acceptable Throughput", International Conference on Very Large Data Bases, Aug. 13, 1990, pp. 148–161.

Primary Examiner—Eddie P. Chan
Assistant Examiner—Reginald G. Bragdon
Attorney, Agent, or Firm—Lee, Mann, Smith, McWilliams, Sweeney & Ohlson

[57] ABSTRACT

A RAID system includes an array of disk units, with data mapped on to the disks as a series of stripes, each containing data and parity chunks. The data chunks of each stripe are located on radially more outer parts of the disks and the parity chunks of each stripe are located on radially more inner parts of the disks. As a result, the amount of head movement for read operations is reduced, which improves the read performance. Successive chunks within each stripe are physically located at successively more radially inward positions on successive disks, so that each stripe has a helical configuration. Mirroring can be considered as a special case in which the number of data chunks is equal to the number of parity chunks, and the parity consists of a simple replication of the data. In this case, data is written to the outermost half of a first disk and to the innermost half of a second disk, and is read from the first disk.

3 Claims, 4 Drawing Sheets

DISK ARRAY WITH PARITY DATA STORAGE ON THE RADIALLY INNER PART OF EACH DISK

BACKGROUND TO THE INVENTION

This invention relates to disk arrays for data storage.

It has become common in recent years to organise a disk subsystem as a RAID (Redundant Array of Inexpensive Disks). RAIDs provide three benefits: higher data availability, higher performance, and higher disk connectivity. However, the performance benefits of RAID until now have been disappointing. RAIDs; employ two main concepts: striping and data redundancy.

Striping means dividing a contiguous address space into portions (generally referred to as "chunks"), and mapping successive chunks on to successive disks of the disk array. The data is thus arranged across the disks in a series of stripes. Striping usually improves the performance of the disk subsystem because it allows a number of data accesses to be made concurrently, from different disks.

Data redundancy means storing parity information on extra disks. Both data and parity are updated when a disk write operation is performed, but only the data is read when a disk read operation is performed. Data redundancy generally increases availability significantly, since if one disk fails, the data can still be recovered from other disks. Mirroring can be considered as a special case of data redundancy, where the parity information consists of a simple replication of the data.

Both striping and redundancy may be employed in the same system. For example, each stripe may consist of d data chunks and p parity chunks, these chunks being distributed across d+p disks, such that each chunk within a stripe is located on a different disk. Mirroring can be regarded as a special case, where the number of parity chunks is equal to the number of data chunks, d=p.

One object of the present invention is to provide a novel form of RAID system using both striping and data redundancy, having an improved read performance compared with known RAID systems.

SUMMARY OF THE INVENTION

According to a first aspect of the invention there is provided a RAID system comprising a plurality of disk units, wherein data is mapped on to the disks as a series of stripes, each stripe containing a plurality of chunks, including at least one data chunk and at least one parity chunk, wherein the data chunks of each stripe are located on radially more outer parts of the disks and the parity chunks of each stripe are located on radially more inner parts of the disks.

If each stripe contains d data chunks and p parity chunks, then the data chunks are located on the radially more outer fraction d/(d+p) of each disk, and the parity chunks are located on the radially more inner fraction p/(d+p) of each disk.

As will be shown, an advantage of this arrangement is that, because the data chunks are all located on the radially more outer parts of the disks, the amount of head movement for read operations is significantly reduced, which significantly improves the read performance.

In one form of the invention, successive chunks within each stripe are physically located at successively more radially inward positions on successive disks. This arrangement of stripes will be referred to herein as "helical" striping, since the stripes may be regarded as tracing helical paths, if the disks are notionally arranged in a circle. An advantage of this helical striping is that the number of chunks per stripe does not have to be equal to the number of disks, allowing greater flexibility of RAID configuration.

The invention is equally applicable to a data storage disk array in which data is mirrored. As mentioned above, mirroring can be considered as a special case in which the number of data chunks is equal to the number of parity chunks, and the parity consists of a simple replication of the data.

According to a second aspect of the invention, there is provided a mirrored data storage disk array comprising:

(a) at least one pair of disk units;

(b) means for writing data to the disks such that each data item is written to the outermost half of one of the disks, and to the innermost half of the other of the disks; and (c) means for reading data from the disk in which it is stored in the outermost half.

BRIEF DESCRIPTION OF THE DRAWINGS

Two embodiments of the invention will now be described by way of example with reference to the accompanying drawings.

DESCRIPTION OF A FIRST EMBODIMENT OF THE INVENTION

Figure 1:
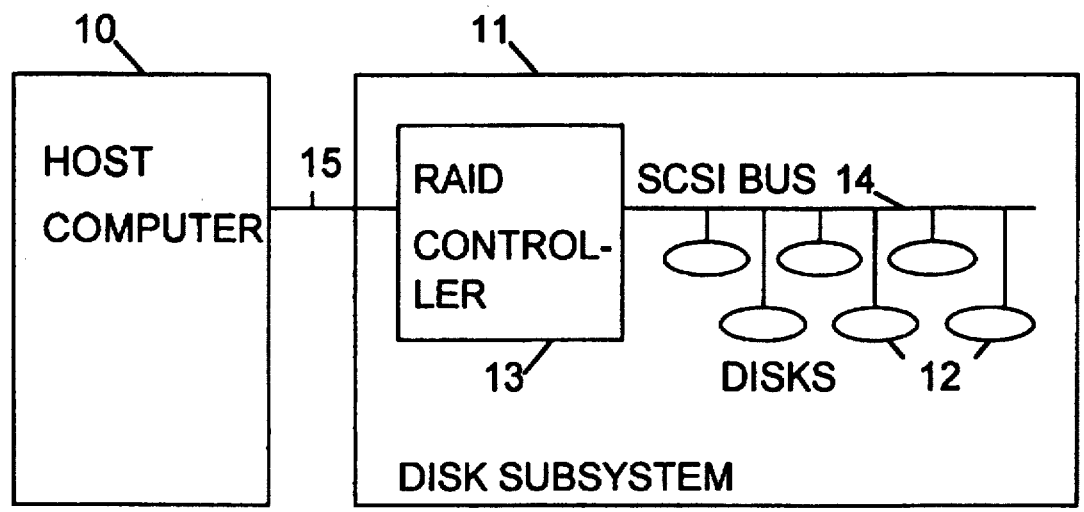
FIG. 1 is a block diagram of a first embodiment of the invention, comprising computer system including a disk array.

Referring to FIG. 1, a computer system comprises a host computer 10, connected to a disk subsystem 11. The disk subsystem comprises an array of disk drives 12, connected to a RAID controller 13 by way of a standard SCSI (Small Computer System Interconnection) bus 14. In this example, there are six disk drives. The host computer sends disk READ and WRITE requests to the RAID controller in the disk subsystem over a host bus 15. Each request contains a host data address (HA). A write request also contains the data to be written.

Figure 2:
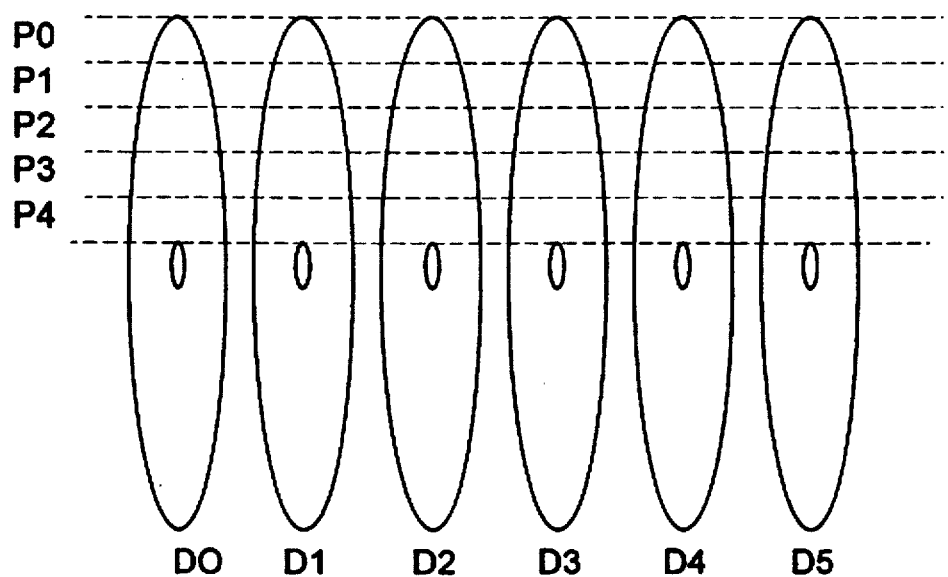
FIG. 2 is a schematic diagram showing the way the disks are organised in the disk array of FIG. 1.

Referring to FIG. 2, the disk array comprises six disk drives D0–D5. Each disk is divided into 5 partitions P0–P4, where P0 is the radially outermost partition and P4 is the radially innermost partition.

These partitions are organised into six helical stripes H0–H5, as shown in Table 1.

TABLE 1

| partition number | Disks | | | | | |
|---|---|---|---|---|---|---|
| | D0 | D1 | D2 | D3 | D4 | D5 |
| P0 | H0 | H1 | H2 | H3 | H4 | H5 |
| P1 | H5 | H0 | H1 | H2 | H3 | H4 |
| P2 | H4 | H5 | H0 | H1 | H2 | H3 |
| P3 | H3 | H4 | H5 | H0 | H1 | H2 |
| P4 | H2 | H3 | H4 | H5 | H0 | H1 |

It can be seen that the first partition of each of these stripes is always the radially outermost partition on a disk, the second partition is always the second most outer partition of the next disk, and so on. (The disks are conceptually arranged in a circle, so that the "next" disk after disk D5 is D0). Thus, each of these helical stripes contains disk partitions ranging from the outermost disk cylinders to the innermost disk cylinders.

The data address space is divided into a number of logical stripes, each of which comprises four 4-Kbyte data chunks. The RAID controller generates a parity chunk for each stripe, consisting of the exclusive-OR of the four data chunks in that stripe. Thus, in this example, d=4, p=1, and the redundancy ratio d:p is equal to 4:1.

The five chunks of each of these logical stripes are respectively stored in the five partitions of one of the helical stripes. The RAID controller maps the logical stripes into the helical stripes in a round-robin fashion, such that the logical stripe numbered s is stored within the helical stripe numbered s mod n, where n is the total number of disks (6 in this embodiment). Thus, for example, logical stripes 0, 6, 12 . . . are stored within helical stripe H0, logical stripes 1, 7, 13 . . . are stored within helical stripe H1, and so on.

As a result, successive chunks of each logical stripe are located at successively more radially inward positions on successive disks. This is in contrast to conventional RAID systems which locate each of the chunks of a stripe at the same location within each of the component disks.

Table 2 shows the result of this mapping of the logical stripes into the helical stripes. In this table, the notation s.c is used to represent chunk c of stripe s. For example, stripe 0 consists of the chunks 0.0, 0.1, 0.2, 0.3 and 0.4. Stripe 0 is highlighted in bold in the table, for clarity. Chunks 0–3 of each stripe are the data chunks and chunk 4 is the parity chunk.

TABLE 2

| partition number | Disks | | | | | |
|---|---|---|---|---|---|---|
| | D0 | D1 | D2 | D3 | D4 | D5 |
| P0 | 0.0 | 1.0 | 2.0 | 3.0 | 4.0 | 5.0 |
| | 6.0 | 7.0 | 8.0 | 9.0 | 10.0 | 11.0 |
| P1 | 5.1 | 0.1 | 1.1 | 2.1 | 3.1 | 4.1 |
| | 11.1 | 6.1 | 7.1 | 8.1 | 9.1 | 10.1 |
| P2 | 4.2 | 5.2 | 0.2 | 1.2 | 2.2 | 3.2 |
| | 10.2 | 11.2 | 6.2 | 7.2 | 8.2 | 9.2 |
| P3 | 3.3 | 4.3 | 5.3 | 0.3 | 1.3 | 2.3 |
| | 9.3 | 10.3 | 11.3 | 6.3 | 7.3 | 8.3 |
| P4 | 2.4 | 3.4 | 4.4 | 5.4 | 0.4 | 1.4 |
| | 8.4 | 9.4 | 10.4 | 11.4 | 6.4 | 7.4 |

It can be seen that the data chunks are all located in the radially outermost fraction d/(d+p) of the disks, and the parity chunks are all located in the radially innermost fraction p/(d+p) of the disks. Therefore, in the absence of disk failure, a read transfer involves only the outermost fraction d/(d+p) of the disks. (The parity data needs to be read only if a disk has failed). This significantly reduces the amount of head movement for read operations, and hence improves the overall performance of the disk subsystem. The actual improvement in performance depends on the redundancy ratio d:p. In the present example, d:p is equal to 4:1, and using current 7200 rpm SCSI disk drives, this would potentially give a 15% read performance improvement. A redundancy ratio of 1:1 would potentially lead to a 50% read performance improvement.

It has been found that, in practice, around 70% of all disk operations are reads and therefore this invention can significantly increase the number of disk transfers per second for a RAID disk subsystem.

The number of chunks in a stripe should be not greater than the number of disks in the array, so as to ensure that each chunk is stored on a different disk. In other words, the number of chunks in a stripe may be equal to or less than the number of disks. In contrast, conventional RAID systems using striping require the number of chunks in a stripe to be equal to the number of disks in the array. Hence, the present invention leads to greater flexibility in the choice of these parameters.

Some Possible Modifications

It will be appreciated that many modifications can be made to the system described above with reference to FIGS. 1 and 2, without departing from the scope of the present invention.

For example, there may be a different number of disks in the array, a different number of chunks in each stripe, or a different redundancy ratio.

Furthermore, the mapping of the logical stripes into the helical stripes may be varied. For example, instead of mapping the logical stripes one at a time to the helical stripes, a predetermined number of logical stripes may be mapped to each helical stripe in turn before going on to the next helical stripe. Table 3 shows an example of such an alternative mapping, in which two logical stripes are mapped to each helical stripe in turn.

TABLE 3

| partition number | Disks | | | | | |
|---|---|---|---|---|---|---|
| | D0 | D1 | D2 | D3 | D4 | D5 |
| P0 | 0.0 | 2.0 | 4.0 | 6.0 | 8.0 | 10.0 |
| | 1.0 | 3.0 | 5.0 | 7.0 | 9.0 | 11.0 |
| P1 | 10.1 | 0.1 | 2.1 | 4.1 | 6.1 | 8.1 |
| | 11.1 | 1.1 | 3.1 | 5.1 | 7.1 | 9.1 |
| P2 | 8.2 | 10.2 | 0.2 | 2.2 | 4.2 | 6.2 |
| | 9.2 | 11.2 | 1.2 | 3.2 | 5.2 | 7.2 |
| P3 | 6.3 | 8.3 | 10.3 | 0.3 | 2.3 | 4.3 |
| | 7.3 | 9.3 | 11.3 | 1.3 | 3.3 | 5.3 |
| P4 | 4.4 | 6.4 | 8.4 | 10.4 | 0.4 | 2.4 |
| | 5.4 | 7.4 | 9.4 | 11.4 | 1.4 | 3.4 |

DESCRIPTION OF A SECOND EMBODIMENT OF THE INVENTION

Figure 3:
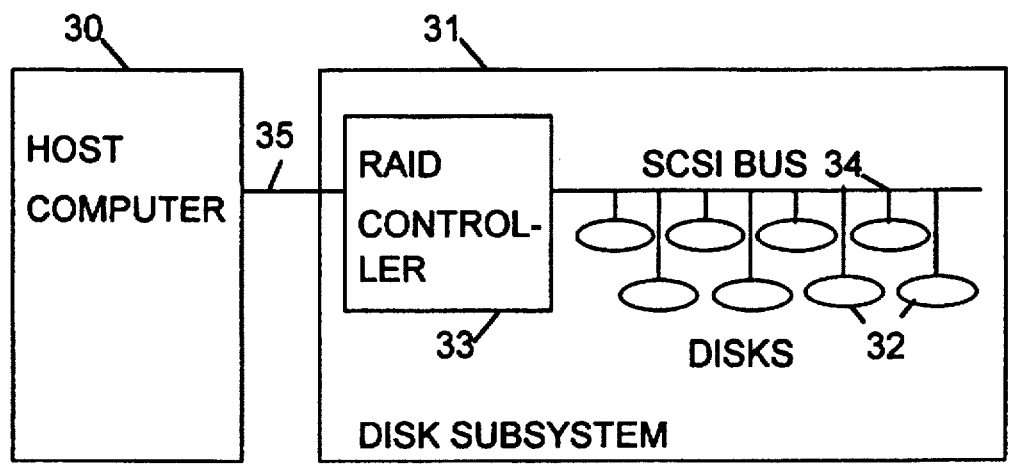
FIG. 3 is a block diagram of a second embodiment of the invention, comprising a computer system including a mirrored disk array.

Referring to FIG. 3, a computer system comprises a host computer 30, connected to a disk subsystem 31. The disk subsystem comprises an array of disk drives 32, connected to a RAID controller 33 by way of a standard SCSI (Small Computer System Interconnection) bus 34. In this example, there are eight disk drives, arranged in two banks; that is, there are four pairs of disks. The host computer sends disk READ and WRITE requests to the RAID controller in the disk subsystem over a host bus 35. Each request contains a host data address (HA). A write request also contains the data to be written.

Data is striped across each bank of disks. If the chunk size is c bytes, and the number of disks in each bank is n, then each stripe contains n*c data bytes.

Data is mirrored between each pair of disks, so that each disk contains the same data as the other disk of the same pair. However, as will be described in more detail below, in contrast to conventional mirrored RAID systems, the data is held in different locations in the two disks of each mirrored pair. More specifically, the data on the radially outermost half of each disk is the same as the data on the radially innermost half of the other disk of the mirrored pair. In normal operation, it is arranged that data is always read from the disk that stores the requested data on its outermost half. (The data is read from the other disk of the pair only if the first disk fails). This significantly reduces the amount of head movement for read operations, and hence improves the overall performance of the disk subsystem. It has been found that, in practice, around 70% of disk operations are reads, and that arranging the mirrored data in this way leads to around a 20% improvement in read performance.

The bank chosen for reading is changed every m stripes, where m is an integer equal to or greater than 1. Thus, if each stripe contains n*c data bytes, then the bank chosen for reading is changed every m*n*c data bytes. In other words, starting from address 0, the first m*n*c data bytes are read from bank 0, the next m*n*c data bytes are read from bank 1, and so on.

Preferably the chunk size c is either 8 Kilobytes or 16 Kilobytes, and so each stripe contains either 32 Kilobytes or 64 Kilobytes of data. This chunk size is chosen to yield the best overall performance: small disc reads are serviced by a single disk, while large disk reads (of more than 16 Kilobytes) are serviced by more than one concurrent disk access. Disk writes naturally involve twice as many disks since both disks of each pair must be kept up to date.

Figure 4:
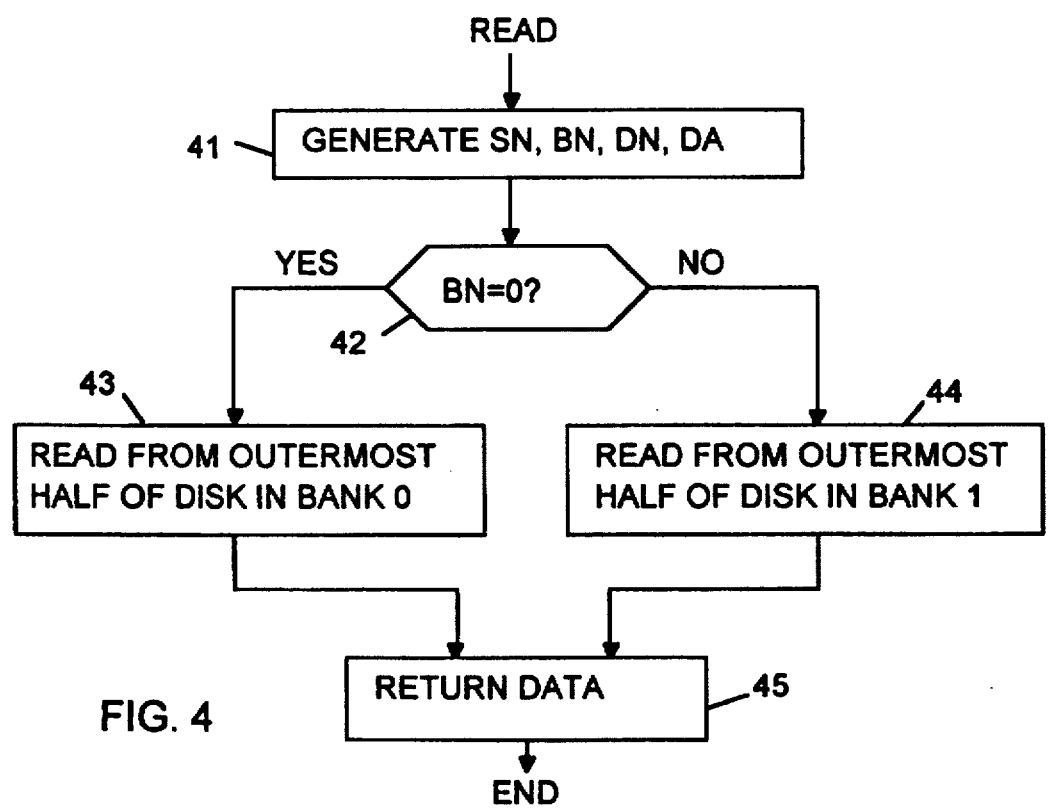
FIG. 4 is a flow chart showing the operation of the disk array of FIG. 3 when performing a disk read.

Referring to FIG. 4, steps 41–45, when the RAID controller receives a disk READ request, it uses the host data address HA to generate a stripe number SN, bank number BN, disk number DN, and disk address DA as follows:

$SN=HA \ div \ (n*c)$ $BN=((SN) \ div \ m) \ mod \ 2$ $DN=(HA \ mod \ (n*c)) \ div \ c$ $DA=m*c* \ (SN \ div \ 2m)+c*(SN \ mod \ m)+HA \ mod \ c.$ (The notation x div y means the whole number part of the result of dividing x by y; x mod y means the remainder after dividing x by y.)

The bank number BN is used to select one of the two banks of disks (bank 0 or bank 1), and the disk number DN selects one of the disks within the selected bank. (Viewed another way, the disk number DN selects a pair of disks, and the bank number BN selects one disk of this pair). The disk address DA is used to select the physical location of the data on the selected disk. It can be seen that, if SN div m is even, the data is read from bank 0; conversely if SN div m is odd, the data is read from bank 1. It is assumed that the maximum possible value for DA is less than G/2, where G is the total capacity of the disk, in bytes. Thus, the data is always read from the outermost half of the disk, assuming that the outermost tracks of the disk have the lowest disk addresses.

Figure 5:
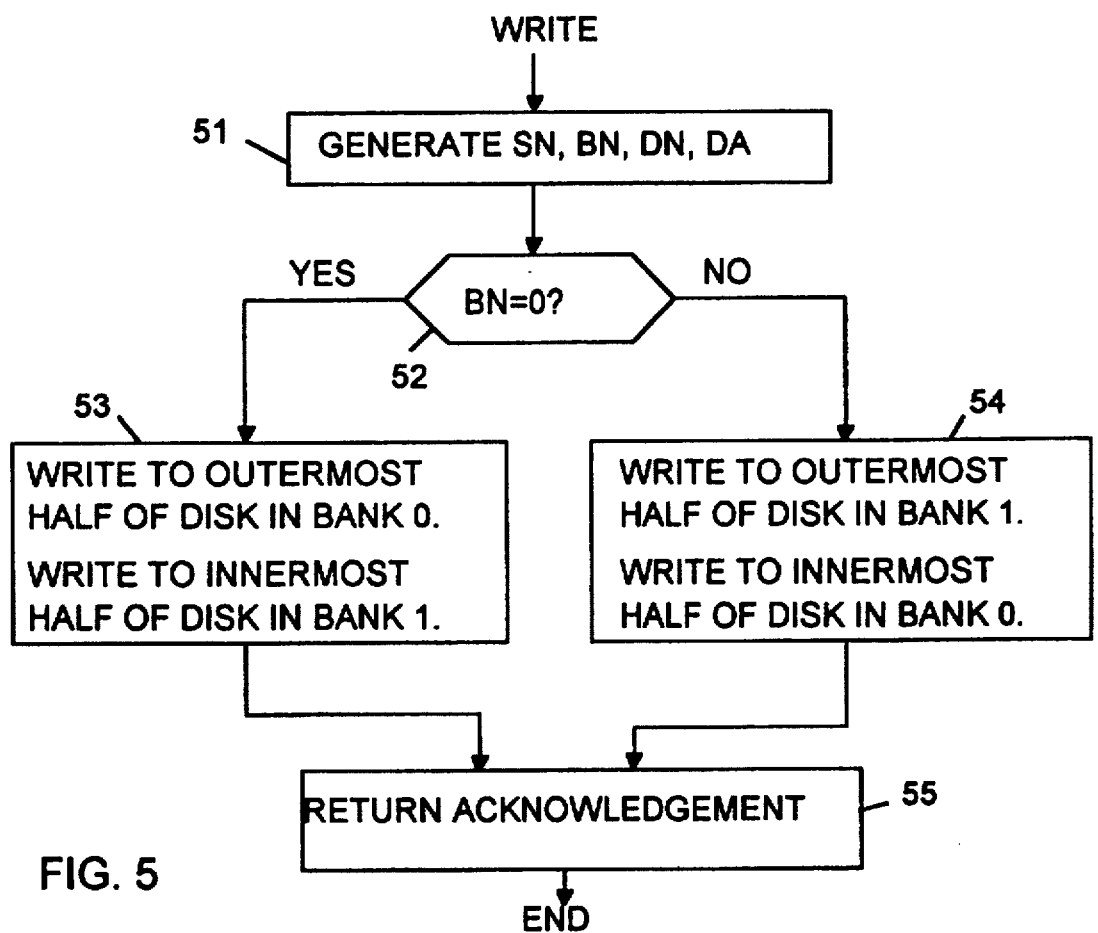
FIG. 5 is a flow chart showing the operation of the disk array of FIG. 3 when performing a disk write.

Referring to FIG. 5, steps 51–55, when the RAID controller receives a disk WRITE request, it uses the host data address to generate a stripe number SN, bank number BN, disk number DN, and disk address DA in the same way as for a READ request, and writes the data to the specified location on the specified disk. At the same time, it writes the same data to the other disk of the same pair, this time using a disk address equal to DA+G/2. Thus it can be seen that the data is written into the outermost half of the disk from which it is to be read, and the same data is written into the innermost half of the other disk of the pair.

Figure 6:
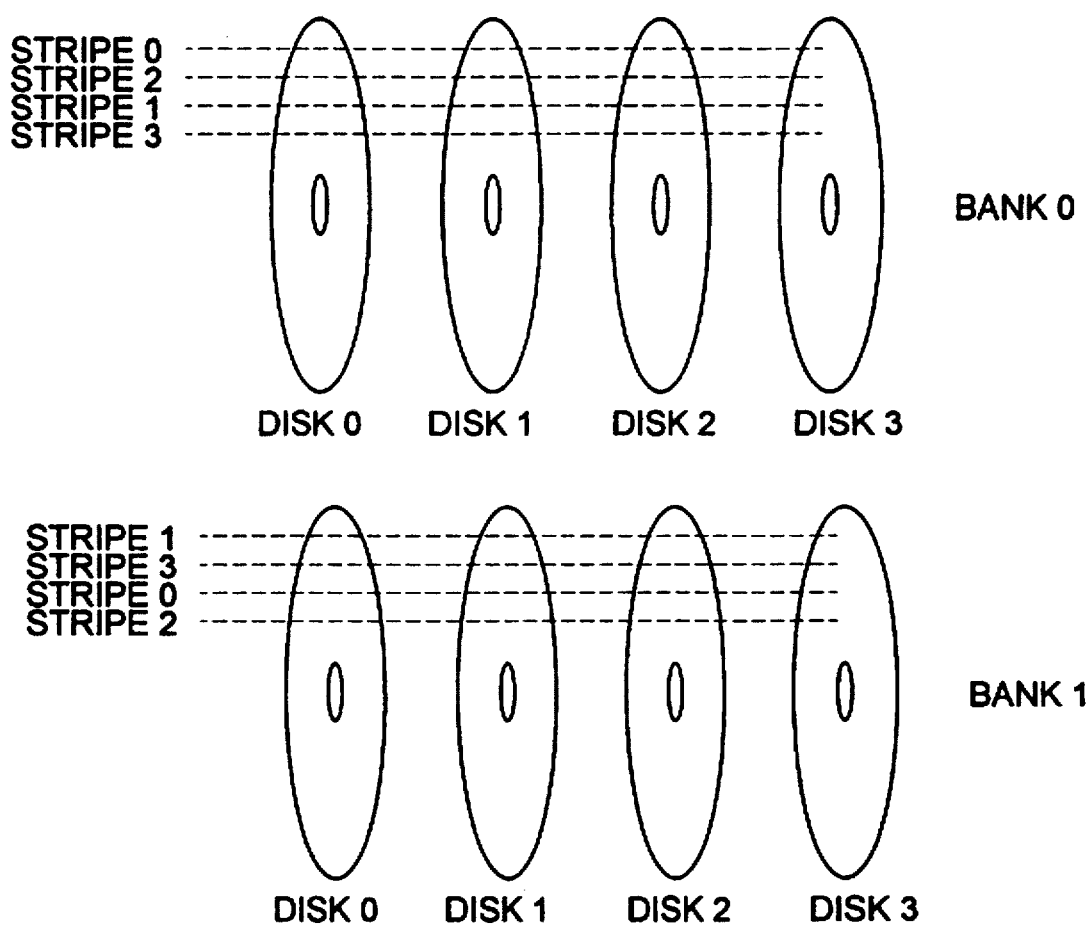
FIG. 6 is a schematic diagram showing the way in which data is distributed on the disks of the disk array of FIG. 3.

FIG. 6 illustrates the way the data would be arranged on the disks, for the case where there are four disks in each bank (i.e. n=4). It is assumed for simplicity that there are only four stripes, although it will be appreciated that in practice there will be many more: for a 4 Gigabyte disk there will be in excess of 1000 stripes. This example also assumes that m=1, so that the bank chosen for reading is changed for each stripe. Thus, stripe 0 is read from bank 0, stripe 1 is read from bank 1, stripe 2 is read from bank 0, and stripe 3 is read from bank 1. It will be observed that the data is located in the outermost half of the disk from which it is read.

Using the same tabular notation as before, the arrangement of the chunks on the disks can be represented as shown in the following Table 4. In this case, each stripe has eight chunks, the first four of which are data chunks and the last four of which are parity chunks, which consist of a simple replication of the data. For example, stripe 0 consists of data chunks 0.0 to 0.3 and parity chunks 0.4 to 0.7. Each disk is divided into just two partitions: P0 which represents the outermost half of the disk, and P1 which represents the innermost half.

TABLE 4

| partition | BANK 0 | | | | BANK 1 | | | |
|---|---|---|---|---|---|---|---|---|
| number | D0 | D1 | D2 | D3 | D0 | D1 | D2 | D3 |
| P0 | 0.0 | 0.1 | 0.2 | 0.3 | 1.0 | 1.1 | 1.2 | 1.3 |
|  | 2.0 | 2.1 | 2.2 | 2.3 | 3.0 | 3.1 | 3.2 | 3.3 |
| P1 | 1.4 | 1.5 | 1.6 | 1.7 | 0.4 | 0.5 | 0.6 | 0.7 |
|  | 3.4 | 3.5 | 3.6 | 3.7 | 2.4 | 2.5 | 2.6 | 2.7 |

It can be seen that, in this arrangement, the stripes can still be regarded as being helical in form, although in this case the helix is very flat, such that each stripe remains within the same partition across a number of disks, before moving to the next partition.

The system described above can be considered to be an enhancement of RAID 10. Compared with RAID 10, it provides a greatly increased data transfer rate for read transfers. It is also able to support an increased number of users.

Some Possible Modifications

It will be appreciated that many modifications may be made to the system described above with reference to FIGS. 3–6, without departing from the scope of the invention.

For example, the disk subsystem may include only one mirrored pair of disks (i.e. n=1). A stripe then contains just one data chunk and one parity chunk. This embodiment can be regarded as a RAID 1 enhancement. In this case, the availability is the same as for RAID 1, the read throughput and transfer rate will be greater than those of RAID 1, and the write throughput and transfer rates will be approximately equal to those of RAID 1.

What is claimed is:

1. A RAID system comprising a plurality of disk units, wherein data is mapped on to the disks as a series of stripes, each stripe comprising d data chunks and p parity chunks, where d and p are both greater than zero, wherein the data chunks of each stripe are physically located within a radially outer fraction d/(d+p) of each disk and the parity chunks of each stripe are physically located within a radially inner fraction p/(d+p) of each disk, and wherein successive chunks within each stripe are physically located at successively more radially inward positions on successive disks, whereby each stripe has a helical configuration.

2. A RAID system comprising a plurality of disk units, wherein data is mapped on to the disks as a series of stripes, each stripe comprising d data chunks and p parity chunks, where d and p are both greater than zero, wherein successive chunks within each stripe are physically located at successively more radially inward positions on successive disks, whereby each stripe has a helical configuration, the parity chunks of each stripe being physically located at a radially most inward end of each stripe.

3. A method of operating a mirrored data storage disk array comprising at least two banks of data storage disks, the method comprising the steps:

(a) upon receiving a write command containing a data item and a write address, applying a predetermined mapping operation to said write address to select one of said banks as a primary bank and to select another of said banks as a secondary bank, and then writing said data item into a radially outer half of the disks said primary bank, and also into a radially inner half of the disks of said secondary bank; and (b) upon receiving a read command containing a read address, applying said predetermined mapping operation to said read address to select one of said banks as a primary bank, and then reading data solely from the radially outer half of the disks in said primary bank.

* * * * *